US012204646B2

(12) United States Patent
Mishra Gupta et al.

(10) Patent No.: US 12,204,646 B2
(45) Date of Patent: Jan. 21, 2025

(54) SHARED LIBRARY CUSTOMIZATION

(71) Applicant: INTERNATIONAL BUSINESS MACHINES CORPORATION, Armonk, NY (US)

(72) Inventors: Shachee Mishra Gupta, Ghaziabad (IN); Ashok Pon Kumar Sree Prakash, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 17/807,148

(22) Filed: Jun. 16, 2022

(65) Prior Publication Data

US 2023/0409716 A1 Dec. 21, 2023

(51) Int. Cl.
  *G06F 21/57* (2013.01)
  *G06F 9/445* (2018.01)
(52) U.S. Cl.
  CPC .......... *G06F 21/57* (2013.01); *G06F 9/44505* (2013.01); *G06F 2221/033* (2013.01)
(58) Field of Classification Search
  CPC ............... G06F 21/57; G06F 9/44505; G06F 2221/033; G06F 2009/45562; G06F 2009/45575; G06F 9/45558
  See application file for complete search history.

(56) References Cited

U.S. PATENT DOCUMENTS

| | | | |
|---|---|---|---|
| 10,949,178 B1 * | 3/2021 | Russell | G06F 8/71 |
| 10,977,100 B2 | 4/2021 | Ambichl | |
| 2016/0094538 A1 * | 3/2016 | Dabbiere | G06F 8/63 |
| | | | 717/121 |
| 2022/0129539 A1 * | 4/2022 | Walsh | G06F 21/53 |

FOREIGN PATENT DOCUMENTS

| CN | 111897538 A | 11/2020 |
|---|---|---|
| CN | 107220537 B | 2/2021 |

OTHER PUBLICATIONS

Agadakos et al., "Large-Scale Debloating of Binary Shared Libraries", Digital Threats: Research and Practice, vol. 1 No. 4, Article 19, Publication, Dec. 17, 2020, 28 Pgs, <https://doi.org/10.1145.3414997>.

Davidson et al., "Towards Automated Application—Specific Software Stacks", 14 pgs, arXiv:1907.01933v3 {cs.CR] Sep. 16, 2019.

Docket Security, 6 Pgs, Downloaded Apr. 5, 2022, <https://docs.docker.com/engne/security/>.

(Continued)

*Primary Examiner* — Anh Nguyen
(74) *Attorney, Agent, or Firm* — Stosch Sabo (57) ABSTRACT

Described are techniques for shared library customization. The techniques include generating a customized library for a container image associated with an application and a shared library. The customized library includes a subset of the shared library with functionalities utilized by the application retained in the customized library and functionalities not utilized by the application removed from the customized library. The techniques further include executing the application on a deployed container image, where the application utilizes the customized library.

20 Claims, 8 Drawing Sheets

(56) References Cited

OTHER PUBLICATIONS

Ghavamnia et al., "Confine: Automated System Call Policy Generation Fo Rcontainer Attack Surface Reduction", Downloaded Apr. 5, 2022, 2 Pgs, <https://www.usenix.org/conference/raid2020/presentation/ghavanmnia>.

Lopes et al, "Container Hardening Through Automated Seccomp Profiling", 6 Pgs, Dec. 7-11, 2020, ACM ISBN 978-1-4503-8209-0/20/12, <https://doi.org/10.1145/3429885.3429966>.

Mell et al., "The NIST Definition of Cloud Computing", National Institute of Standards and Technology, Special Publication 800-145, Sep. 2011, 7 pages.

Microsoft, Microsoft—Cloud, Computers, Apps & Gaming, Downloaded Apr. 5, 2022, 3 Pgs, <https://www.microsoft.com/en-us/>.

Mishra et al., "Saffire: Context-Sensitive Function Specialization against Code Reuse Attacks," 2020 IEEE European Symposium on Security and Privacy (EuroS&P), 2020, 17 Pgs, Apr. 5, 2022, doi: 10.1109/EuroSP48549.2020.00010.

Quach et al., "Debloating Software Through Piece-Wise Compilation and Loading", 3 Pgs, Downloaded Apr. 5, 2022, <https://www.usenix.org/conference/usenixsecurity18/presentation/quach>.

Song et al., "Fine-Grained Library Customization", Pennsylvania State University, ARxIV:1810.11128V1 [cs.SE] Oct. 25, 2018, 5 Pgs.

\* cited by examiner

SHARED LIBRARY CUSTOMIZATION

BACKGROUND

The present disclosure relates to computer security, and, more specifically, to developing custom libraries for specific container images.

Applications can utilize libraries (e.g., libc, libjpeg, libcrypto, etc.) during execution. Libraries can be statically linked (e.g., all used library functions are copied to an executable file) or dynamically linked (e.g., a library is linked to a binary file at runtime without any copying). Dynamically linked libraries can be referred to as shared libraries. While statically linked libraries can be maintained using, for example, dead-code removal, dynamically linked libraries do not undergo any such maintenance. Furthermore, most applications only use a small number of the functionalities provided by a dynamically linked library.

SUMMARY

Aspects of the present disclosure are directed toward a computer-implemented method comprising generating a customized library for a container image associated with an application and a shared library. The customized library can include a subset of the shared library with functionalities utilized by the application retained in the customized library and functionalities not utilized by the application removed from the customized library. The method further comprises executing the application on a deployed container image, where the application utilizes the customized library.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward computer security, and, more specifically, to developing custom libraries for specific container images. While not limited to such applications, embodiments of the present disclosure may be better understood in light of the aforementioned context.

One security vulnerability of containers utilizing shared libraries (e.g., dynamically linked libraries) relates to code reuse attacks whereby existing code from an application's address space is repurposed for malicious purposes. For example, a command return-to-libc looks for an address of system( ) and can execute a command such as system ("/bin/sh") to launch a shell for malicious activity. As another example, Return Oriented Programming (ROP) attacks can be configured to overwrite a return address in an application stack and thereby steer control to a random instruction within the virtual address space of the application. Such attacks can use functions like system( ) fork( ) exec( ) malloc( ) and mmap( ) among others, to launch a new process and/or allocate memory for malicious shellcode.

Collectively, these code reuse attacks rely on functions, calls, and/or other code-related functionalities available to an application and/or container. Accordingly, when an application and/or container utilizes a shared library, the attack surface available for a code reuse attack is increased. Furthermore, when an application and/or container only utilizes a small number of the available functionalities in the shared library, the attack surface available for a code reuse attack is increased without a comparable benefit (e.g., each unused functionality in the shared library presents a security vulnerability).

Aspects of the present disclosure are directed to increasing security of applications and/or containers utilizing shared libraries by decreasing the code reuse attack surface. More specifically, aspects of the present disclosure can generate custom libraries tailored to specific container deployments. Such custom libraries can be attached to a container image as metadata, and when the application is deployed in the container, the custom libraries can be used by retrieving the metadata from the container image.

Advantageously, aspects of the present disclosure reduce vulnerabilities associated with code reuse attacks insofar as the custom libraries include only those library functionalities actually needed or utilized by a given application and/or container. Thus, all unneeded or unutilized libraries are not included in a custom library, thereby reducing the attack surface available to a malicious actor deploying a code reuse attack.

Figure 1:
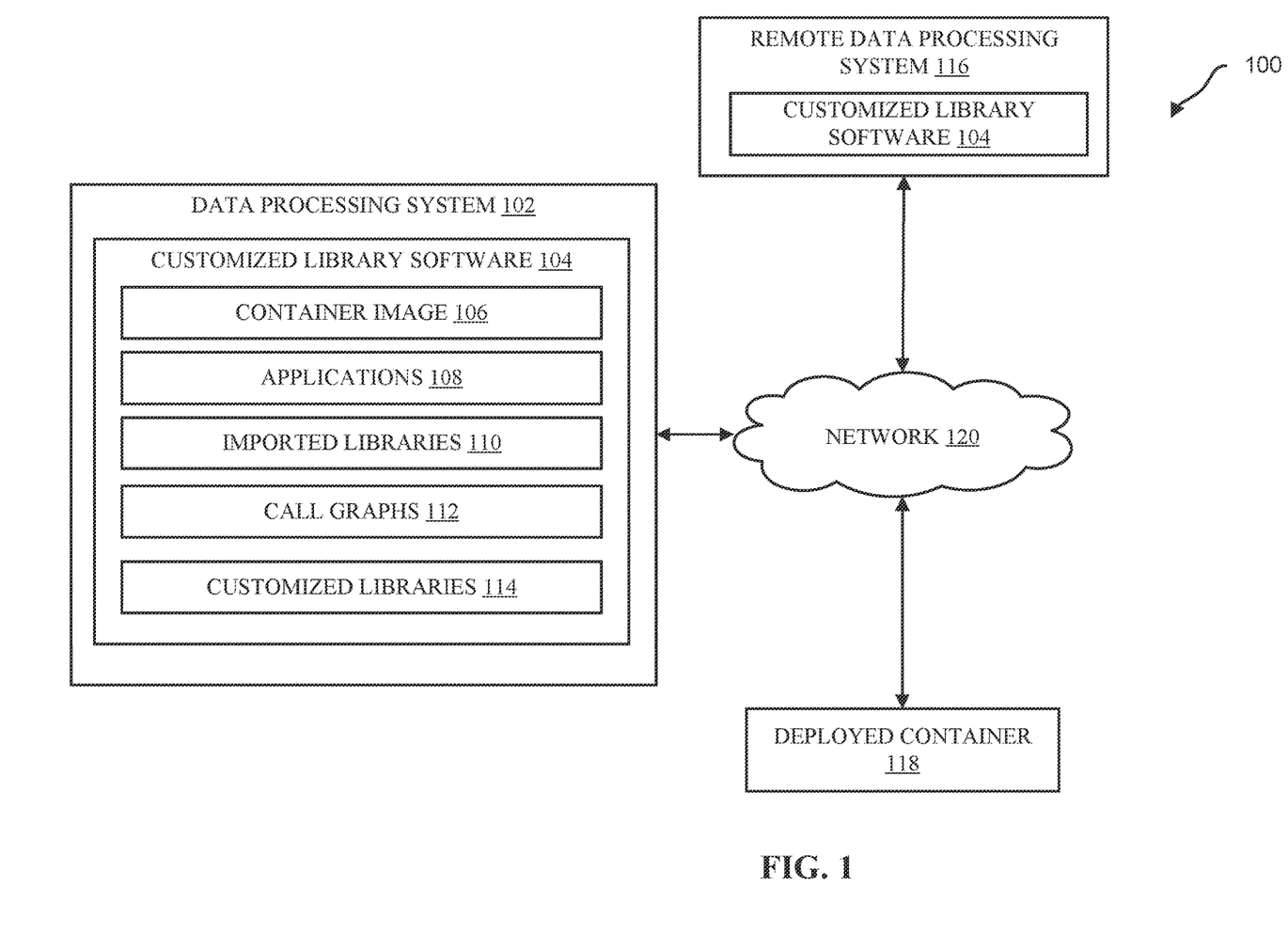
FIG. 1 illustrates a block diagram of an example computational environment implementing customized library software, in accordance with some embodiments of the present disclosure.

Referring now to the figures, FIG. 1 illustrates a block diagram of an example computational environment 100 implementing customized library software 104, in accordance with some embodiments of the present disclosure. The computational environment 100 includes a data processing system 102, remote data processing system 116, and deployed container 118 communicatively coupled to one another via a network 120. The network 120 can be a local area network (LAN), a wide area network (WAN), an intranet, the Internet, or any other network 120 or group of networks 120 capable of continuously, semi-continuously, or intermittently connecting (directly or indirectly) the aforementioned components together.

Customized library software 104 can be executed on the data processing system 102. In some embodiments, the customized library software 104 is downloaded to the data processing system 102 from a remote data processing system 116. In other embodiments, some aspects of the customized library software 104 are implemented by the data processing system 102 and other aspects of the customized library software 104 are implemented by the remote data processing system 116.

The customized library software 104 can be configured to receive a container image 106 and one or more applications 108 that can be executed on the container image 106. The customized library software 104 is further configured to receive one or more imported libraries 110, where at least a portion of the imported libraries 110 are utilized by the applications 108. The customized library software 104 is configured to generate call graphs 112 reflecting how the applications 108 utilize the imported libraries 110. The customized library software 104 can then generate customized libraries 114. The customized libraries 114 include a subset of the functionalities of the imported libraries 110. More specifically, the customized libraries 114 include only those functionalities that are utilized by the applications 108 (e.g., as indicated by the call graphs 112). Thus, the customized libraries 114 include fewer functionalities than the imported libraries 110 while enabling the applications 108 to remain fully functional. Advantageously, the customized libraries 114 increase the security posture of the container image 106 by reducing the attack surface for a code reuse attack.

In some embodiments, the customized libraries 114 are associated with metadata of the container image 106. The deployed container 118 can then utilize the container image 106, the applications 108, and the customized libraries 114 to securely implement the applications 108 on the deployed container 118 using the customized libraries 114.

The data processing system 102, the remote data processing system 116, and deployed container 118 can be any computer, server, mainframe, virtual machine (VM), container, tablet, notebook, smartphone, other computer hardware (physical or virtualized), multiples of the aforementioned, and/or combinations of the aforementioned. As will be appreciated by one skilled in the art, FIG. 1 is representative of some embodiments of the present disclosure but should not be construed as limiting. In other embodiments, more or fewer similar or dissimilar components than the components shown in FIG. 1 can be present. Furthermore, in various embodiments, the components shown in FIG. 1, if they are present at all, can be combined together into unified components or separated into discrete components.

Figure 2:
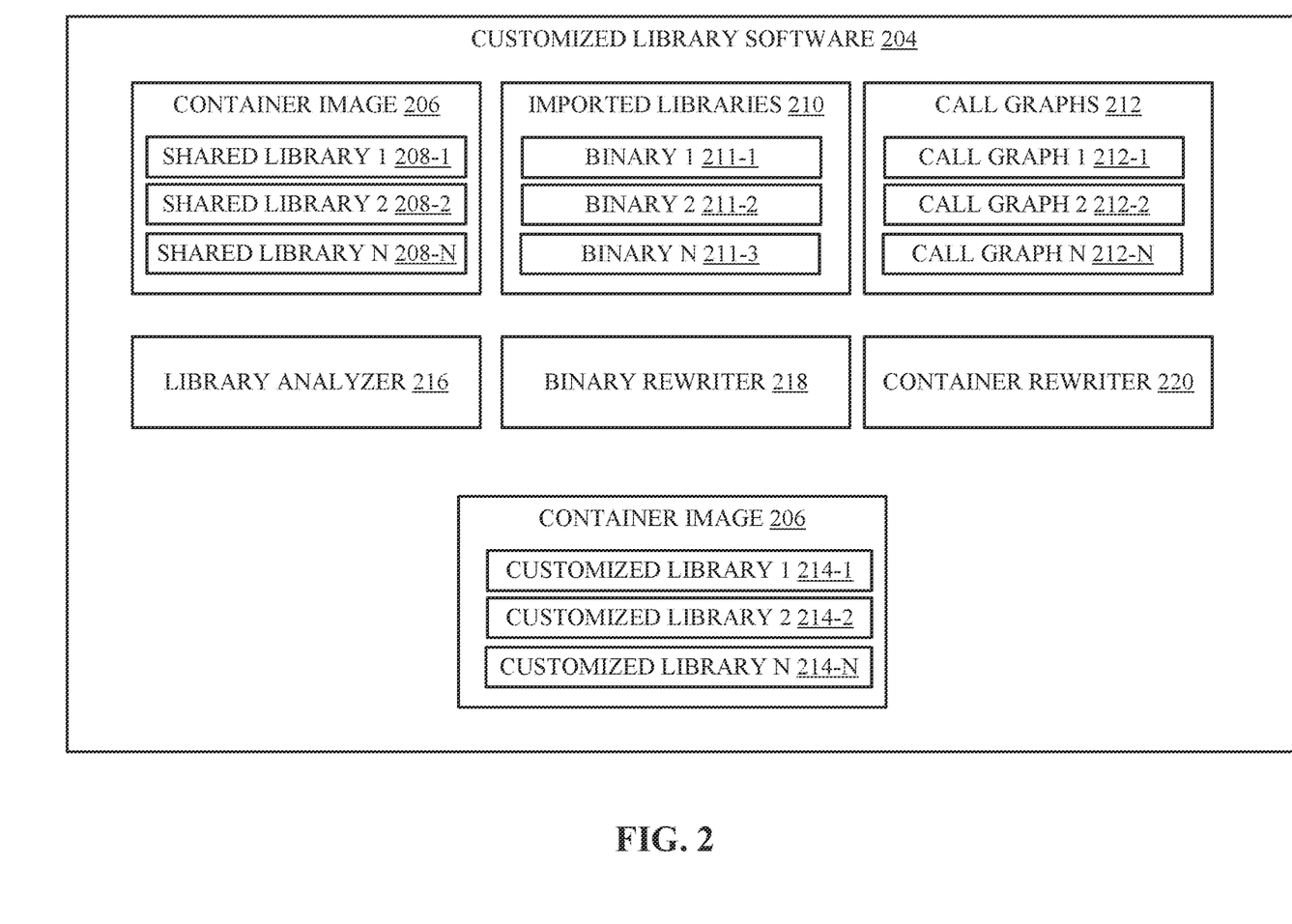
FIG. 2 illustrates a block diagram of an example implementation of customized library software, in accordance with some embodiments of the present disclosure.

FIG. 2 illustrates a block diagram of an example implementation of customized library software 204, in accordance with some embodiments of the present disclosure. In some embodiments, the customized library software 204, container image 206, imported libraries 210, call graphs 212, and customized libraries 214 are consistent with customized library software 104, container image 106, imported libraries 110, call graphs 112, and customized libraries 114, respectively, as described with respect to FIG. 1.

Container image 206 can include numerous shared libraries 208 such as shared library 1 208-1, shared library 2 208-2, and shared library N 208-N, where N can represent any positive integer ranging from one (e.g., a single shared library) to tens, hundreds, or thousands (representing many shared libraries). Shared libraries 208 can be dynamically linked libraries.

Imported libraries 210 can represent the functionalities provided by the shared libraries 208. Imported libraries 210 can include binaries 211, such as binary 1 211-1, binary 2 211-2, and binary N 211-3 (though more or fewer binaries 211 are possible in other embodiments). In various embodiments, one binary 211 can be associated with each shared library 208, whereas in other embodiments, multiple binaries 211 can be associated with a single shared library 208 and/or multiple shared libraries 208 can be associated with a single binary 211.

Call graphs 212 can include a call graph associated with each of the shared libraries 208, such as call graph 1 212-1, call graph 2 212-2, and call graph N 212-N. Call graphs 212 can represent, in graphical form, functionalities, control flows, and/or execution sequences of the shared libraries 208.

Library analyzer 216 can use the call graphs 212 to differentiate utilized portions of each shared library 208 from unutilized portions of each shared library 208 for the applications executed on the container image 206. Binary rewriter 218 can modify the binaries 211 of the imported libraries 210 to cull (e.g., remove, delete, etc.) unutilized portions of the shared libraries 208 as determined by the library analyzer 216 and the call graphs 212. In doing so, the binary rewriter 218 can create customized libraries 214 (e.g., customized library 1 214-1, customized library 2 214-2, and customized library N 214-N) corresponding to each of the shared libraries 208.

Binary rewriter 218 can perform the above functionality using binary rewriting. Binary rewriting can refer to changing semantics of a compiled (and potentially dynamically linked) program without having access to the underlying source code, and where the altered program nonetheless remains executable. Binary rewriting can be utilized in a variety of applications such as, but not limited to, emulation (e.g., a component that imitates behavior of one platform on another platform), observation (e.g., implementing profiling and/or tracing tools), optimization (e.g., run-time patching), hardening (e.g., exploit aversion mechanisms), and/or other applications.

Container rewriter 220 can modify the container image 206 to include the customized libraries 214 in place of the shared libraries 208. In some embodiments, container rewriter 220 appends customized libraries 214 as metadata to container image 206. In some embodiments, container rewriter 220 utilizes binary rewriting, whereas in other embodiments, the container rewriter 220 utilizes other techniques to modify aspects of the container image 206.

In some embodiments, the library analyzer 216, binary rewriter 218, and/or container rewriter 220 can be embodied as computer-executable program instructions capable of causing one or more hardware components (physical or virtualized) to implement functionality previously described with respect to the library analyzer 216, binary rewriter 218, and/or container rewriter 220. Furthermore, although the library analyzer 216, binary rewriter 218, and container rewriter 220 are shown as discrete components, in other embodiments, the library analyzer 216, binary rewriter 218, and/or container rewriter 220 can be combined together as a single executable program. Although FIG. 2 illustrates numerous components within an implementation instance of the customized library software 204, in other embodiments, some of the illustrated components can be accessed outside of the implementation instance of the customized library software 204, such as through a network connection.

Figure 3A:
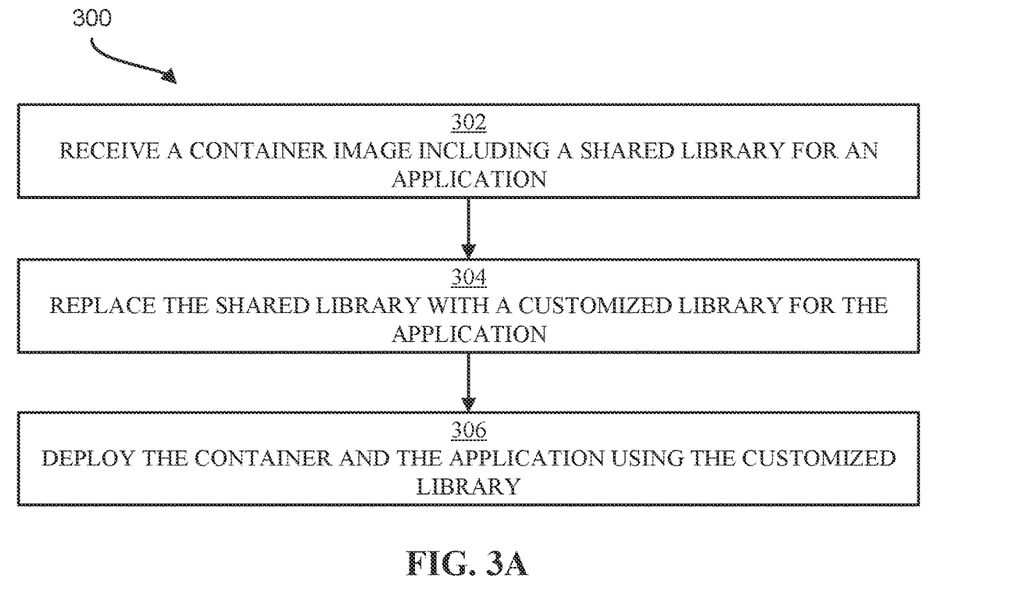
FIG. 3A illustrates a flowchart of an example method for deploying a container including a customized library, in accordance with some embodiments of the present disclosure.

FIG. 3A illustrates a flowchart of an example method 300 for deploying a container including a customized library, in accordance with some embodiments of the present disclosure. In some embodiments, the method 300 is implemented by, for example, a data processing system (e.g., data processing system 102 and/or remote data processing system 116 of FIG. 1), a computer, a processor, or another configuration of hardware and/or software.

Operation 302 includes receiving a container image (e.g., container image 106 of FIG. 1) including a shared library (e.g., imported libraries 110 of FIG. 1) for an application (e.g., applications 108 of FIG. 1).

Operation 304 includes replacing the shared library with a customized library (e.g., customized libraries 114 of FIG. 1) for the application. In some embodiments, the customized library includes only those functionalities that are utilized by the application, where the remaining, unused functionalities are removed. In some embodiments, operation 304 utilizes a call graph (e.g., call graph 112 of FIG. 1) to differentiate utilized portions and unutilized portions of a shared library for an application. In some embodiments, the customized library is appended to the container image as metadata. In some embodiments, binary rewriting is used to convert the shared library to the customized library. Operation 304 is discussed in more detail hereinafter with respect to FIG. 3B.

Operation 306 includes deploying the container (e.g., deployed container 118 of FIG. 1) and the application using the customized library. Advantageously, the deployed container utilizing the customized library exhibits improved security from code reuse attacks relative to a deployed container utilizing the original, shared library.

Figure 3B:
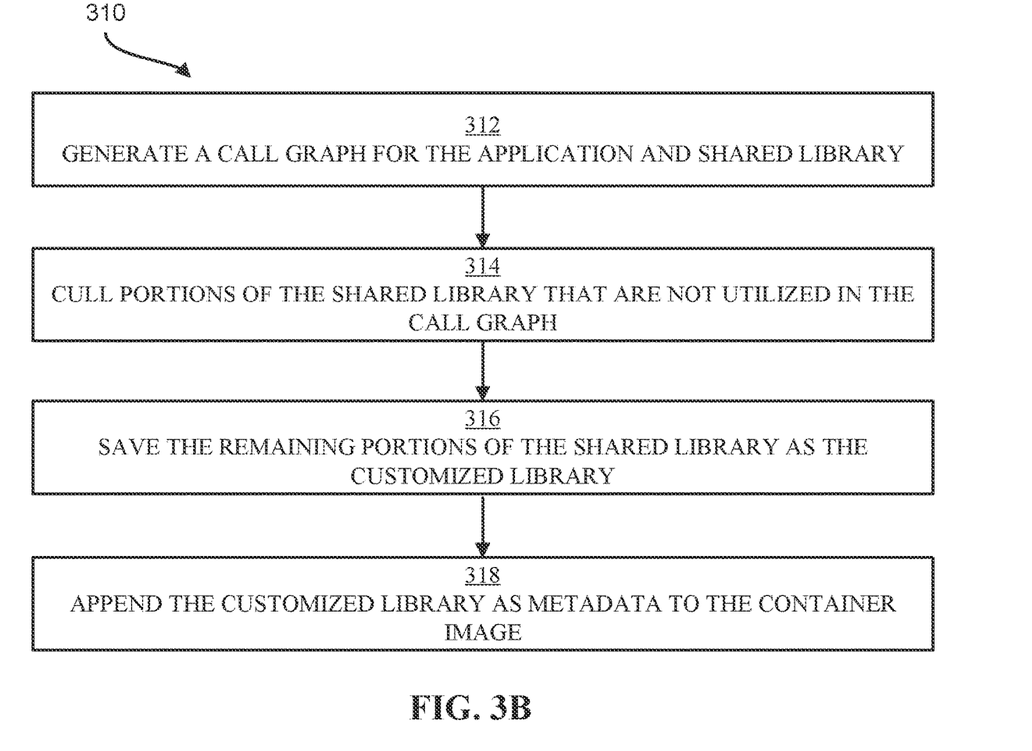
FIG. 3B illustrates a flowchart of an example method for generating a customized library, in accordance with some embodiments of the present disclosure.

FIG. 3B illustrates a flowchart of an example method 310 for generating a customized library, in accordance with some embodiments of the present disclosure. In some embodiments, the method 310 is implemented by, for example, a data processing system (e.g., data processing system 102 and/or remote data processing system 116 of FIG. 1), a computer, a processor, or another configuration of hardware and/or software. In some embodiments, the method 310 is a sub-method of operation 304 of FIG. 3A.

Operation 312 includes generating a call graph (e.g., call graph 112 of FIG. 1) for the application (e.g., application 108 of FIG. 1) and shared library (e.g., imported libraries 110 of FIG. 1). The generated call graph can be used to differentiate utilized portions from unutilized portions of the shared library during execution of the application.

Operation 314 includes culling portions of the shared library that are not utilized in the call graph. In other words, operation 314 can remove functionalities from the shared library that are not used by any execution sequence of the application.

Operation 316 includes saving the remaining portions (e.g., those portions of the shared library that are utilized by one or more execution sequences of the application) as the customized library (e.g., customized library 114 of FIG. 1). Operation 318 includes appending the customized library as metadata to the container image.

Figure 4:
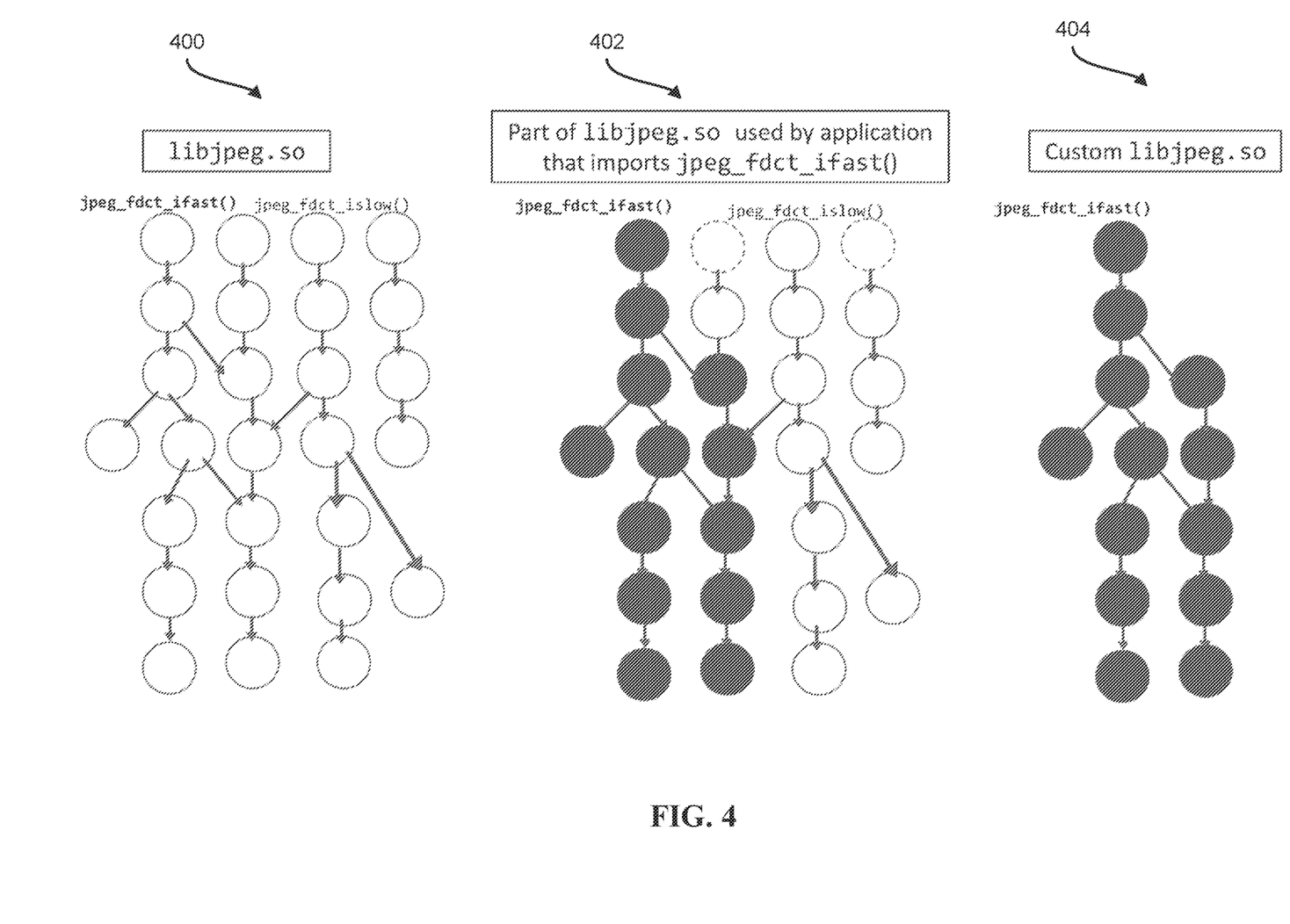
FIG. 4 illustrates a block diagram of a shared library, a portion of the shared library utilized by an application, and a customized library, in accordance with some embodiments of the present disclosure.

FIG. 4 illustrates a block diagram of a shared library 400, a utilized portion of the shared library 402 that is utilized by an application, and a customized library 404, in accordance with some embodiments of the present disclosure. Shared library 400 can be consistent with imported libraries 110 of FIG. 1. Shared library 400 illustrates all available functionalities in call graph form of the shared library 400. Utilized portion of the shared library 402 illustrates a call graph with shaded nodes representing utilized portions of the shared library and unshaded nodes representing unutilized portions of the shared library. Customized library 404 illustrates only those portions of the shared library 400 that are utilized by the application. In other words, customized library 404 includes only the shaded nodes of the utilized portion of the shared library 402, where the unshaded nodes of the utilized portion of the shared library 402 are removed. As shown, the customized library 404 includes fewer nodes (e.g., functionalities) than the shared library 400, thereby reducing the attack surface of a deployed container implementing the application while retaining full functionality of the application utilizing the customized library 404.

Figure 5:
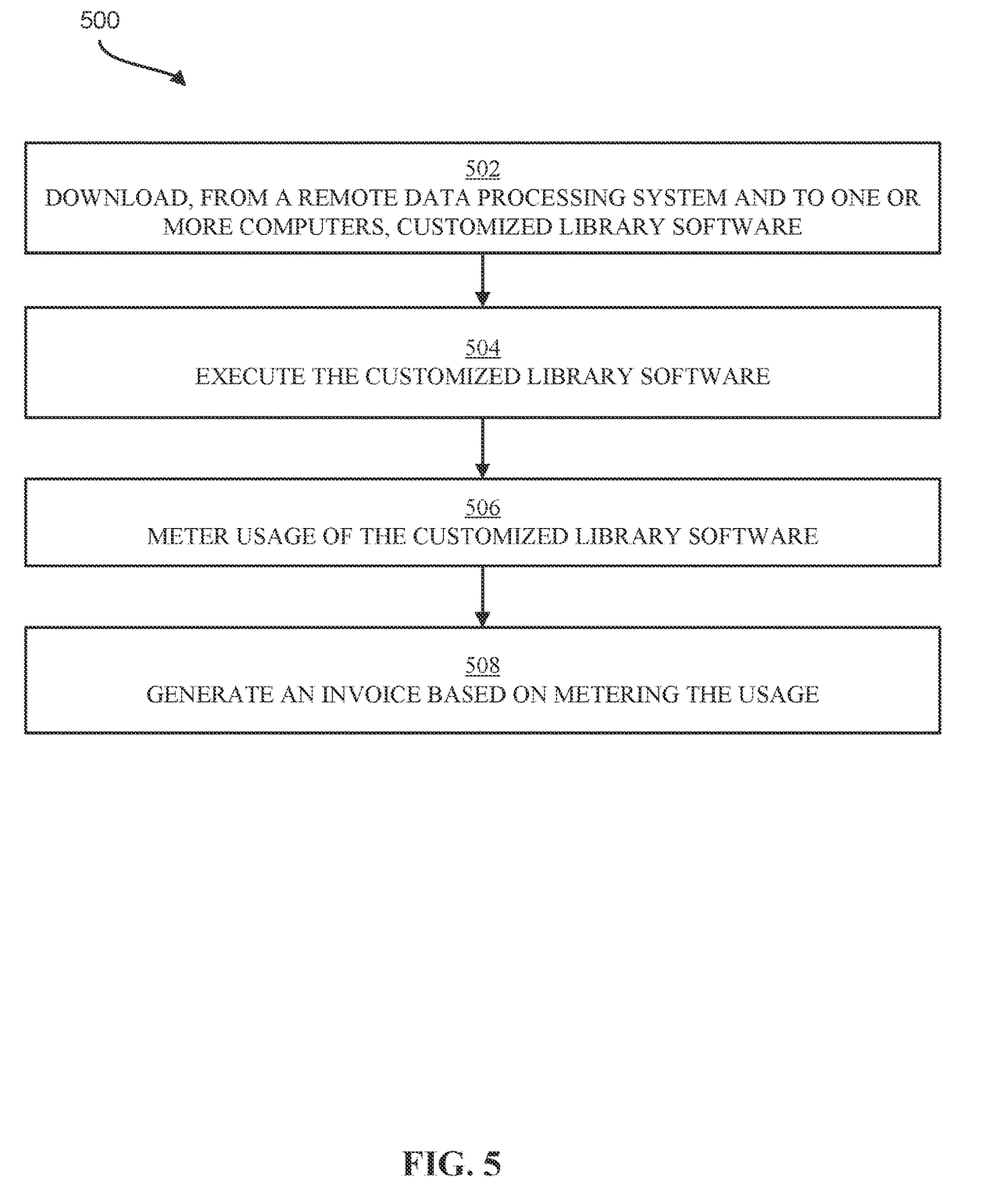
FIG. 5 illustrates a flowchart of an example method for downloading, deploying, metering, and billing usage of customized library software, in accordance with some embodiments of the present disclosure.

FIG. 5 illustrates a flowchart of an example method 500 for downloading, deploying, metering, and billing usage of customized library software 104, in accordance with some embodiments of the present disclosure. In some embodiments, the method 500 is implemented by a computer, a server, a processor, a data processing system (e.g., data processing system 102 and/or remote data processing system 116 of FIG. 1), or another configuration of hardware and/or software. In some embodiments, the method 500 occurs contemporaneously with the method 300 of FIG. 3A and/or the method 310 of FIG. 3B.

Operation 502 includes downloading, from a remote data processing system (e.g., remote data processing system 116 of FIG. 1) and to one or more computers (e.g., data processing system 102 of FIG. 1), customized library software (e.g., customized library software 104 of FIG. 1). Operation 504 includes executing the customized library software. Operation 504 can include performing any of the methods and/or functionalities discussed herein. Operation 506 includes metering usage of the customized library software. Usage can be metered by, for example, an amount of time the customized library software is used, a number of workstations deploying the customized library software, an amount of resources consumed by implementing the customized library software, a number or size of customized libraries (e.g., customized libraries 114 of FIG. 1) generated by implementing the customized library software, and/or other usage metering metrics. Operation 508 includes generating an invoice based on metering the usage.

Figure 6:
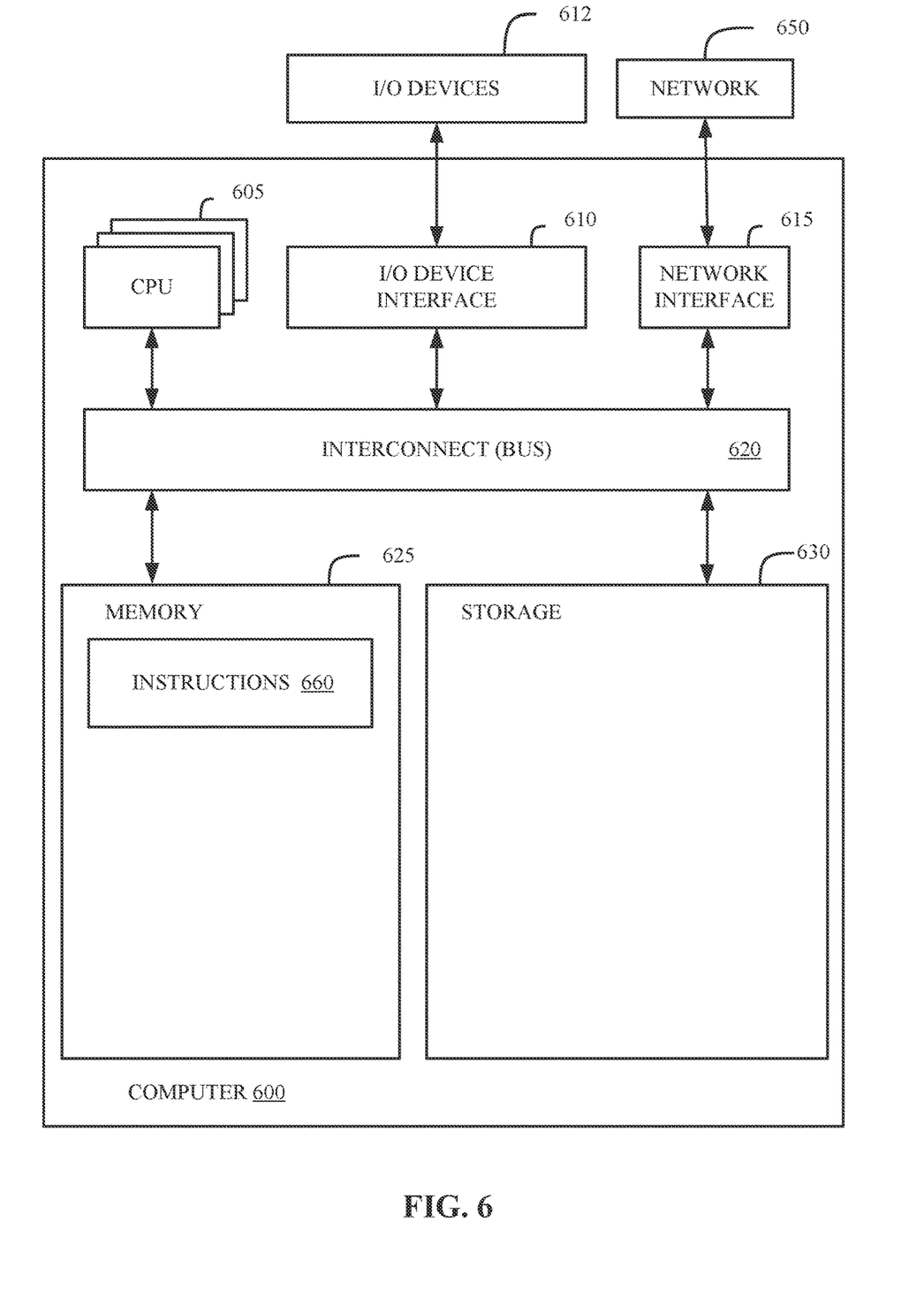
FIG. 6 illustrates a block diagram of an example computer, in accordance with some embodiments of the present disclosure.

FIG. 6 illustrates a block diagram of an example computer 600 in accordance with some embodiments of the present disclosure. In various embodiments, computer 600 can perform any or all portions of the methods described in FIGS. 3A-3B and 5 and/or implement the functionality discussed in FIGS. 1, 2, and/or 4. In some embodiments, computer 600 receives instructions related to the aforementioned methods and functionalities by downloading processor-executable instructions from a remote data processing system via network 650. In other embodiments, computer 600 provides instructions for the aforementioned methods and/or functionalities to a client machine (e.g., data processing system 102 of FIG. 1) such that the client machine executes the method, or a portion of the method, based on the instructions provided by computer 600. In some embodiments, the computer 600 is incorporated into (or functionality similar to computer 600 is virtually provisioned to) one or more entities illustrated in FIG. 1, FIG. 2, and/or other aspects of the present disclosure.

Computer 600 includes memory 625, storage 630, interconnect 620 (e.g., a bus), one or more CPUs 605 (also referred to as processors herein), I/O device interface 610, I/O devices 612, and network interface 615.

Each CPU 605 retrieves and executes programming instructions stored in memory 625 or storage 630. Interconnect 620 is used to move data, such as programming instructions, between the CPUs 605, I/O device interface 610, storage 630, network interface 615, and memory 625. Interconnect 620 can be implemented using one or more buses. CPUs 605 can be a single CPU, multiple CPUs, or a single CPU having multiple processing cores in various embodiments. In some embodiments, CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random-access memory (e.g., static random-access memory (SRAM), dynamic random-access memory (DRAM), or Flash). Storage 630 is generally included to be representative of a non-volatile memory, such as a hard disk drive, solid state device (SSD), removable memory cards, optical storage, or flash memory devices. In an alternative embodiment, storage 630 can be replaced by storage area-network (SAN) devices, the cloud, or other devices connected to computer 600 via I/O device interface 610 or network 650 via network interface 615.

In some embodiments, memory 625 stores instructions 660. However, in various embodiments, instructions 660 are stored partially in memory 625 and partially in storage 630, or they are stored entirely in memory 625 or entirely in storage 630, or they are accessed over network 650 via network interface 615.

Instructions 660 can be computer-readable and computer-executable instructions for performing any portion of, or all of, the methods of FIGS. 3A, 3B, and/or 5 and/or implement the functionality discussed in FIGS. 1, 2, and/or 4. Although instructions 660 are shown in memory 625, instructions 660 can include program instructions collectively stored across numerous computer-readable storage media and executable by one or more CPUs 605.

In various embodiments, I/O devices 612 include an interface capable of presenting information and receiving input. For example, I/O devices 612 can present information to a user interacting with computer 600 and receive input from the user.

Computer 600 is connected to network 650 via network interface 615. Network 650 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
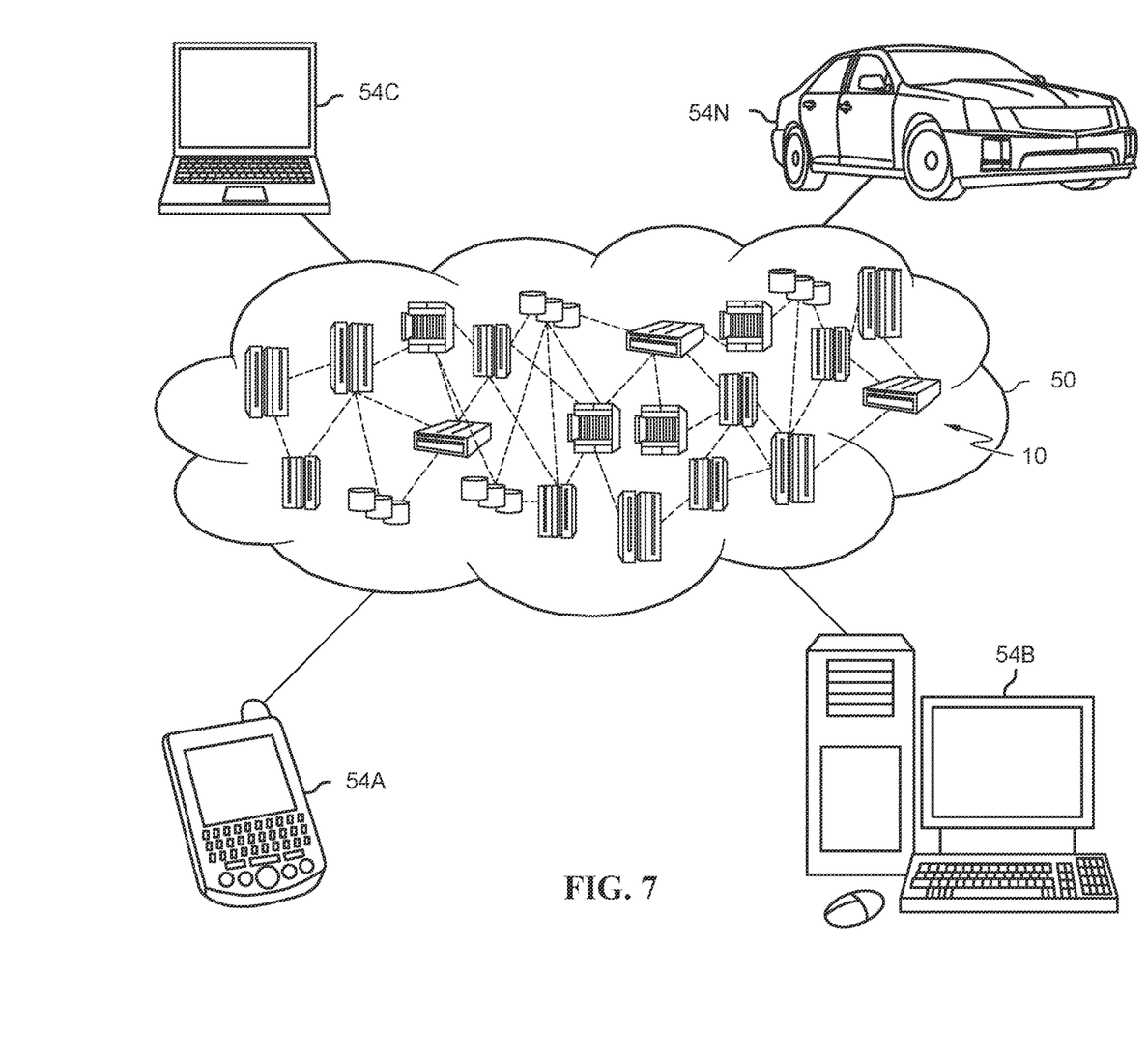
FIG. 7 depicts a cloud computing environment, in accordance with some embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
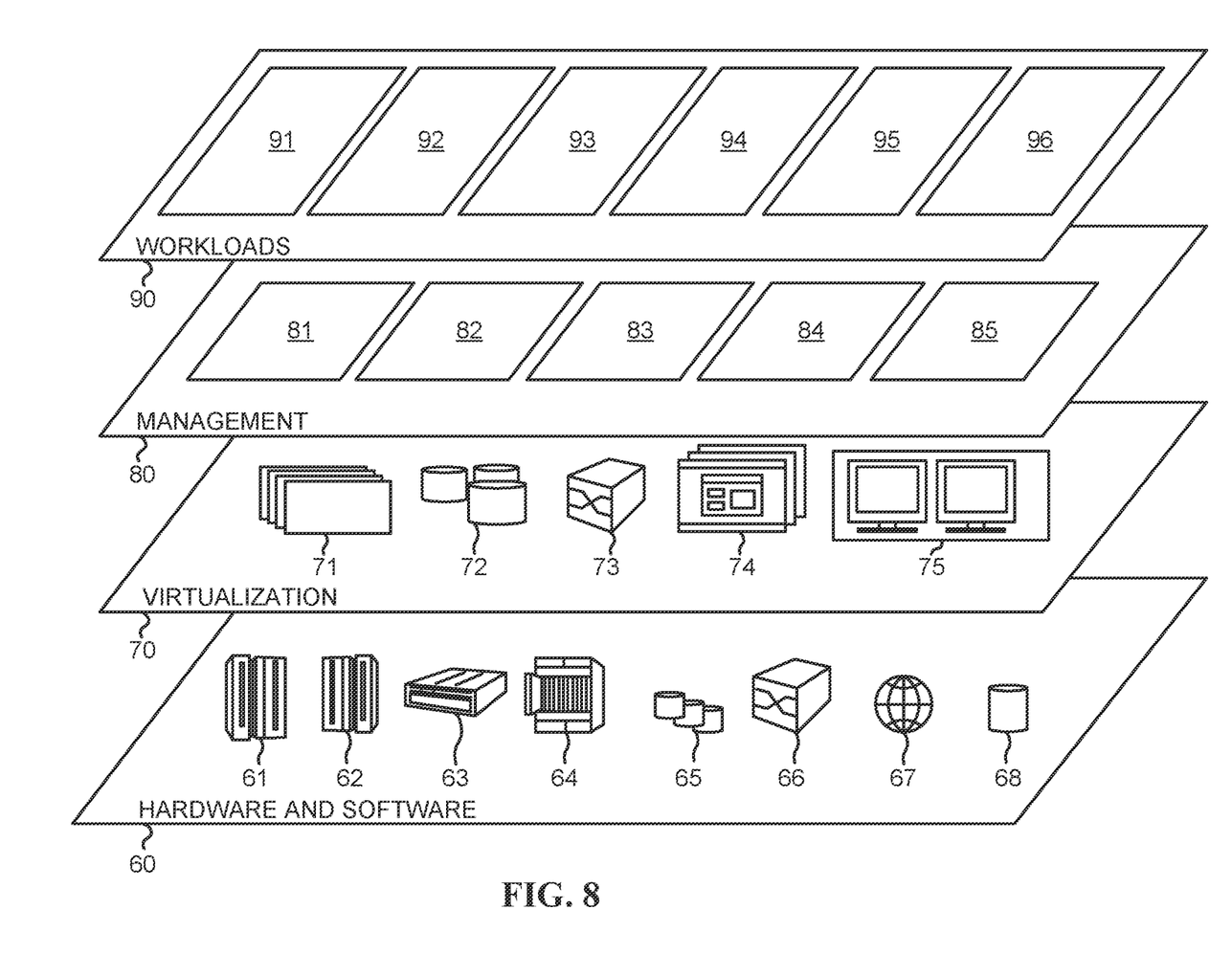
FIG. 8 depicts abstraction model layers, in accordance with some embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and shared library customization 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any portion of the methods described with respect to FIGS. 3A, 3B, and/or 5 and/or the functionalities discussed in FIGS. 1, 2, and/or 4 can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes generating a customized library for a container image associated with an application and a shared library, wherein the customized library includes a subset of the shared library with functionalities utilized by the application retained in the customized library and functionalities not utilized by the application removed from the customized library; and executing the application on a deployed container image, wherein the application utilizes the customized library.

Example 2 includes the features of Example 1. In this example, generating the customized library further comprises: generating a call graph differentiating utilized portions from unutilized portions of the shared library as utilized by the application. Optionally, generating the customized library further comprises: culling the unutilized portions of the shared library; and saving the utilized portions of the shared library as the customized library.

Example 3 includes the features of any one of Examples 1 to 2, including or excluding optional features. In this example, generating the customized library further comprises: appending the customized library to the container image as metadata.

Example 4 includes the features of any one of Examples 1 to 3, including or excluding optional features. In this example, generating the customized library further comprises generating a plurality of customized libraries for a plurality of applications implemented on the container image.

Example 5 includes the features of any one of Examples 1 to 4, including or excluding optional features. In this example, the method is performed by one or more computers according to software that is downloaded to the one or more computers from a remote data processing system. Optionally, the method further comprises: metering a usage of the software; and generating an invoice based on metering the usage.

Example 6 is a system. The system includes one or more computer readable storage media storing program instructions; and one or more processors which, in response to executing the program instructions, are configured to perform a method according to any one of Examples 1 to 5, including or excluding optional features.

Example 7 is a computer program product. The computer program product includes one or more computer readable storage media, and program instructions collectively stored on the one or more computer readable storage media, the program instructions comprising instructions configured to cause one or more processors to perform a method according to any one of Examples 1 to 5, including or excluding optional features.

What is claimed is:

1. A computer-implemented method comprising:
generating a customized library for a container image associated with an application and a shared library, wherein the customized library includes a subset of the shared library with functionalities utilized by the application retained in the customized library and functionalities not utilized by the application removed from the customized library by binary rewriting, wherein the binary rewriting modifies binaries of the shared library without access to underlying source code; and
executing the application on a deployed container image, wherein the application utilizes the customized library.

2. The method of claim 1, wherein generating the customized library further comprises:
generating a call graph differentiating utilized portions from unutilized portions of the shared library as utilized by the application.

3. The method of claim 2, wherein generating the customized library further comprises:
culling the unutilized portions of the shared library by the binary rewriting; and
saving the utilized portions of the shared library as the customized library.

4. The method of claim 1, wherein generating the customized library further comprises:

appending the customized library to the container image as metadata.

5. The method of claim 1, wherein generating the customized library further comprises generating a plurality of customized libraries for a plurality of applications implemented on the container image.

6. The method of claim 1, wherein the method is performed by one or more computers according to software that is downloaded to the one or more computers from a remote data processing system.

7. The method of claim 6, wherein the method further comprises:
   metering a usage of the software; and
   generating an invoice based on metering the usage.

8. A system comprising:
   one or more computer readable storage media storing program instructions; and
   one or more processors which, in response to executing the program instructions, are configured to perform a method comprising:
   generating a customized library for a container image associated with an application and a shared library, wherein the customized library includes a subset of the shared library with functionalities utilized by the application retained in the customized library and functionalities not utilized by the application removed from the customized library by binary rewriting, wherein the binary rewriting modifies binaries of the shared library without access to underlying source code; and
   executing the application on a deployed container image, wherein the application utilizes the customized library.

9. The system of claim 8, wherein generating the customized library further comprises:
   generating a call graph differentiating utilized portions from unutilized portions of the shared library as utilized by the application.

10. The system of claim 9, wherein generating the customized library further comprises:
    culling the unutilized portions of the shared library by the binary rewriting; and
    saving the utilized portions of the shared library as the customized library.

11. The system of claim 8, wherein generating the customized library further comprises:
    appending the customized library to the container image as metadata.

12. The system of claim 8, wherein generating the customized library further comprises generating a plurality of customized libraries for a plurality of applications implemented on the container image.

13. The system of claim 8, wherein the method is performed by one or more computers according to software that is downloaded to the one or more computers from a remote data processing system.

14. The system of claim 13, wherein the method further comprises:
    metering a usage of the software; and
    generating an invoice based on metering the usage.

15. A computer program product comprising one or more computer readable storage media, and program instructions collectively stored on the one or more computer readable storage media, the program instructions comprising instructions configured to cause one or more processors to perform a method comprising:
    generating a customized library for a container image associated with an application and a shared library, wherein the customized library includes a subset of the shared library with functionalities utilized by the application retained in the customized library and functionalities not utilized by the application removed from the customized library by binary rewriting, wherein the binary rewriting modifies binaries of the shared library without access to underlying source code; and
    executing the application on a deployed container image, wherein the application utilizes the customized library.

16. The computer program product of claim 15, wherein generating the customized library further comprises:
    generating a call graph differentiating utilized portions from unutilized portions of the shared library as utilized by the application.

17. The computer program product of claim 16, wherein generating the customized library further comprises:
    culling the unutilized portions of the shared library by the binary rewriting; and
    saving the utilized portions of the shared library as the customized library.

18. The computer program product of claim 15, wherein generating the customized library further comprises:
    appending the customized library to the container image as metadata.

19. The computer program product of claim 15, wherein generating the customized library further comprises generating a plurality of customized libraries for a plurality of applications implemented on the container image.

20. The computer program product of claim 15, wherein the method is performed by one or more computers according to software that is downloaded to the one or more computers from a remote data processing system, and wherein the method further comprises:
    metering a usage of the software; and
    generating an invoice based on metering the usage.

* * * * *